(12) United States Patent
Jandrell

(10) Patent No.: US 6,331,836 B1
(45) Date of Patent: Dec. 18, 2001

(54) METHOD AND APPARATUS FOR RAPIDLY ESTIMATING THE DOPPLER-ERROR AND OTHER RECEIVER FREQUENCY ERRORS OF GLOBAL POSITIONING SYSTEM SATELLITE SIGNALS WEAKENED BY OBSTRUCTIONS IN THE SIGNAL PATH

(75) Inventor: Louis H. M. Jandrell, Plano, TX (US)

(73) Assignee: Fast Location.Net, LLC, Dallas, TX (US)

(*) Notice: Subject to any disclaimer, the term of this patent is extended or adjusted under 35 U.S.C. 154(b) by 0 days.

(21) Appl. No.: 09/645,152

(22) Filed: Aug. 24, 2000

(51) Int. Cl.[7] ............................................. G01S 5/02
(52) U.S. Cl. ........................ 342/357.12; 342/357.05; 701/214
(58) Field of Search ..................... 342/357.12, 357.05, 342/358, 357.06; 701/213, 214, 215

(56) References Cited

U.S. PATENT DOCUMENTS

| | | | |
|---|---|---|---|
| 5,686,925 | * 11/1997 | Maeda | 342/357.12 |
| 5,689,271 | * 11/1997 | Lenneh | 342/357.12 |
| 6,191,730 | * 2/2001 | Nelson, Jr. | 342/357.12 |
| 6,205,377 | * 3/2001 | Lupash | 342/357.12 |
| 6,236,354 | * 5/2001 | Krasner | 342/357.12 |

FOREIGN PATENT DOCUMENTS

405264714 * 10/1993 (JP) ................................. 342/357.12

* cited by examiner

*Primary Examiner*—Richard M. Camby
(74) *Attorney, Agent, or Firm*—Baker Botts L.L.P.

(57) ABSTRACT

Frequency-offset components are extracted from a set of digitized samples of signals transmitted by a satellite. The samples are squared to produce squared samples and decimated. The squared samples are auto-correlated to produce an auto-correlate, and the auto-correlate is truncated. The truncated auto-correlate is transformed into the frequency domain to obtain double-frequency offset components. The scaled offset frequencies are used to compensate for Doppler-shift and receiver frequency errors and for Doppler induced time errors in digitized samples used to estimate pseudorange information.

39 Claims, 6 Drawing Sheets

METHOD AND APPARATUS FOR RAPIDLY ESTIMATING THE DOPPLER-ERROR AND OTHER RECEIVER FREQUENCY ERRORS OF GLOBAL POSITIONING SYSTEM SATELLITE SIGNALS WEAKENED BY OBSTRUCTIONS IN THE SIGNAL PATH

FIELD OF THE INVENTION

The invention relates to determining the geolocation of wireless devices. Specifically, the invention relates to rapidly and autonomously estimating Doppler-shift and other receiver frequency errors in a ranging-receiver when receiving GPS satellite signals, including signals weakened by obstructions in the signal path.

BACKGROUND OF THE INVENTION

In the application of GPS technology to the geolocation of portable wireless devices, it is desirable, because of the limited battery power available in such wireless devices, that the geolocation function: (i) operates with minimum energy consumption; and (ii) completes a geolocating fix in a minimum time.

At or near the surface of the earth, the signal level of GPS satellites is less than the thermal noise level of the conventional GPS receivers due to: (i) the spread spectrum modulation of the signal; (ii) the height of the 12 hour-period orbit (approximately 11,000 miles) of the GPS satellites; and (iii) the limited transmitting power of the satellite. Conventional GPS receivers must use sophisticated signal processing techniques, such as code correlation techniques, to extract the satellite signals.

Furthermore, wireless devices are typically operated in situations where views of the sky, and hence direct line-of-sight with GPS satellites, are frequently obstructed, resulting in further reduction of the levels of the received signals. Consequently, the obstructed signal levels from the GPS satellites are well below the threshold at which conventional GPS receivers can receive reliable position-tracking signals, and certainly below the level where any receiving equipment can receive reliable GPS satellite ephemeris data.

In order to recover these relatively weak satellite signals, the signals must be synchronously de-spread using convolution or correlation techniques. In conventional autonomous GPS receivers with unobstructed signals, this is done by searching for the signals with trial frequencies (since the Doppler-shifts are unknown) and with trial Course Acquisition Codes (C/AC), also referred to as the satellite's "Gold Codes", (since the satellite identities are also unknown). Since the unobstructed signals have relatively good signal-to-noise ratios, a small sample of the signal is sufficient for the correlation search step, and Doppler-shift frequency trial steps can be quite large, so the search proceeds quickly, especially when multiple channels are searched simultaneously (rough estimate of search space of about 3000 frequency/code "boxes" of 5 milliseconds/box=15 seconds). However, when the signals are further weakened, typically by obstructions in the signal path, then many more samples are required (perhaps hundreds to thousands of times more) than are needed for the unobstructed case, and the Doppler-shift search frequency step must be much smaller because of the longer correlation samples. The search may then take a very much longer time (rough estimate of search space of about 300,000 frequency/code "boxes" of 1 second=a few days). What is needed is a faster and more direct method than the above correlation and frequency stepping search approach.

However, because of the repetitive nature of certain aspects of the GPS satellite signals, it is possible to use techniques such as very narrow-band filtering or signal averaging. In narrow-band filtering it is possible to use the Fast Fourier Transform ("FFT") to process long segments of the signal, thereby creating large numbers of narrow "frequency-bins". For example, since "bin" width is inversely proportional to segment length, for a segment length of 1 (one) second, the bin width would be 1 Hz and for a signal bandwidth of 2 MHz, the resulting number of bins would 2 (two) million. The energy of the noise present in the bin-bandwidth is approximately evenly spread across all the "frequency bins". However, the signal energy only falls in a very small number of the bin, thereby making it possible to be better detect the signal against this lowered noise background. In signal averaging, segments of the signal that repeats exactly are coherently added to each other to improve the relationship between the desired signal and the noise.

Both of these processes trade time for signal-to-noise ratio (e.g., either coherent signal energy accumulation or longer signals, enabling narrower analysis bandwidth), to improve the repetitive aspect of the signals against the random noise present in the signals. Both of these processes are possible due to the presence of the aforesaid repetitive properties in the satellite signals, such as the pseudo random ranging code, which repeats exactly every code cycle, or the carrier, which repeats continuously except for modulation changes. When such repetitive signal samples are added coherently, they accumulate linearly (i.e., proportionally to the number of samples). On the other hand, the random noise present in the signals is not coherent, and (in the coherent summation of the repetitive aspect above) accumulates as the square root of the number of samples. For example, with one thousand samples, the repetitive signal would be a thousand times larger, while the noise component would be only approximately thirty times larger.

Therefore, by utilizing specialized algorithms, it is possible to accumulate and process enough of the satellite's signals to obtain reliable tracking information. Tracking information includes Doppler-error, tracking measurement time, pseudorange and satellite identification data. All of the tracking information must be obtained simultaneously for each satellite in view of the ranging-receiver. Furthermore, if the tracking information, which includes an accurate estimate of the time that the tracking information was measured, is transmitted (via the wireless link) to a remote site or to a wireless device, where current ephemeris data has been obtained by conventional GPS receiving equipment operating with a clear view of the sky, then, when processed with the current ephemeris data, an accurate geolocation of the wireless device can be computed.

For the purposes of this application, the term "Doppler-error" is defined as the combination of Doppler-shift and frequency errors in the receiver due to local oscillator instability, aging, thermal effects and manufacturing tolerances. "Doppler-shift" is the frequency shift created by the relative motion between the satellite transmitter and the ranging receiver in the device to be located. Furthermore, frequency-offset or frequency-offsets or offset-frequency or offset-frequencies may be used as appropriate in the following descriptions synonymously with Doppler-error or Doppler-errors, unless specifically modified by alternative adjectives.

Because this signal-averaging process is much longer in duration than processes used by conventional GPS receivers (estimated to be hundreds to thousands of times longer), there is potential for significant improvements in signal detection sensitivity. However, to accumulate the satellite's tracking signal efficiently over such longer intervals, it is necessary to precisely compensate for: (i) the Doppler-shift induced errors (both time and frequency errors) in the signals by the relative motion between the receiver and the satellites broadcasting the signals; and (ii) frequency errors in the receiver's timing source due to factors such as thermal effects, manufacturing tolerances and component aging.

The term "ranging-receiver" is used herein to distinguish between: (i) the partial-function nature of a "ranging-receiver", which is only capable of identifying the GPS satellites and measuring pseudorange; and (ii) the full-function nature of a conventional, autonomous GPS receiver, which is capable of identifying the GPS satellites, measuring pseudorange, receiving and decoding GPS satellite ephemeris data, and making a geolocation estimate.

One attempted method for providing Doppler-shift information to a ranging-receiver operates on the presumption that a special "reference GPS receiver" nearby the ranging-receiver would be able to accurately estimate and relay to the ranging-receiver the Doppler-shift and timing information for each satellite in order to provide the necessary Doppler-shift correction information, and resolve the 1 millisecond time ambiguity between ranging pulses. Such a "reference GPS receiver" would: (i) measure the Doppler-shift and identity of all satellites in view at the remote location of the wireless device from a point also having a similar view of the satellites; and (ii) relay both the satellite identifications ("satellite IDs") and Doppler-shifts and, of necessity, time-base standardizing information, via the wireless link to the GPS ranging-receiver. It is also necessary to keep track of the clock time for each satellite-in-view to allow resolution of the one-millisecond ambiguity. However, this method creates several difficulties and complexities.

For example, in order to cover a wide area, either: (i) a large number of such reference GPS receivers is needed, each such receiver providing coverage for a local radius of approximately a hundred miles (limited by the 1 millisecond ambiguity or approximately half the speed of light multiplied by the 1 millisecond interval between ranging pulses); or (ii) an information server must be provided, capable of interpolating the Doppler-shift information from a smaller number of reference receivers to values applicable to the location nearby to the ranging-receiver of the wireless device.

Furthermore, because Doppler is different at different points of measurement, the Doppler-shift uncertainty between two stationary ranging-receivers a hundred miles apart would be different by as much as 50 Hz, which may further limit the efficiency of the signal averaging process necessary to recover the tracking information from the weakened signals. These "reference GPS receivers" are specialized GPS receivers capable of very precisely measuring and reporting the Doppler-shift of the satellite signals against a "standardized" time-base with a precision suitable for longer integration times, and capable of keeping track of the clock time for each satellite-in-view to resolve the timing ambiguity required for calculating the ranging-receiver's geolocation. The ranging-receiver can then use the reference-receiver's Doppler-shift information to compensate for ranging signals errors introduced by the Doppler-shift before it begins estimating the pseudorange measurement.

However, in order to estimate which reference GPS receiver is "nearby enough" to the wireless device to send it sufficiently accurate Doppler-shift information, the system sending the Doppler-shift information must have a "crude" estimate (i.e., within approximately one hundred miles) of the location of the wireless device. This may be difficult in some cases and near impossible in others, and certainly restricts the use of the method to systems that already have significant integration into the wireless network infrastructure (e.g., the wireless device must be sufficiently integrated in to the wireless network to report the location of the cell-site that is handling the wireless link with the wireless device).

Furthermore, the measurement of frequency implies the use of an agreed standard for the unit of time at the point of measurement and the point of use. This is almost always a difficult implication to deal with when high accuracy is required, since "common time" must be transferred from the point of measurement to the point of application or vice versa with the necessary precision and accuracy.

So, even when sufficiently accurate Doppler-shift information is sent to the wireless device, the sampling time-base in the wireless device must also be synchronized (i.e., calibrated or re-scaled) with the "standard time-base" used to obtain the Doppler-shift information, or else the use of the Doppler-shift information will be distorted by the relative errors between the two time-bases (i.e., the "standard time-base" of the reference GPS receiver and the time-base of the wireless device's ranging-receiver). This time-base calibration or synchronization (or time-scaling) normally requires "tight" integration of the sampling time-base (in the wireless device) with the time-base of the wireless carrier system, and/or with the time-base of the reference GPS monitoring system, to maintain the required level of accuracy and precision.

What is proposed by the applicant is a unique approach that will quickly and autonomously obtain precise Doppler-error correction and an alternate method of providing resolution of the timing ambiguity that does not rely on either: (i) tightly integrating with the carrier's network; or (ii) a support network (or equivalent) of nearby reference GPS receivers to enable the ranging-receiver to provide sufficient tracking information for its geolocation to be calculated.

SUMMARY OF THE INVENTION

The present invention teaches a method whereby both the Doppler-error and the respective satellite's identification can quickly (thereby minimizing the power consumption required for determining a geolocation) and precisely be determined at the wireless device, using only the signal sampling time-base in the ranging-receiver, and in circumstances where the signal's strength has been weakened by obstructions in the signal path, thus making it possible for the wireless device to autonomously and quickly (i.e., in a matter of seconds) obtain reliable tracking information without satellite ID and Doppler-shift information assistance from a remote site.

The invention allows the wireless device, when connected with its carrier network, to transmit the estimated pseudorange, the time-of-day ("TOD") of the pseudorange measurement, satellite ID and Doppler-error information for each of the satellite signals being received (collectively the "tracking information") from any unknown location and anytime after making the ranging measurement (i.e. not limited to first knowing the location of points "nearby" the wireless device and not requiring any high precision synchronization with any particular network's timing system). The pseudorange, the TOD of the pseudorange measurement and the satellite ID information can be processed with the ephemeris data (collectively the "geolocating data") of all the GPS satellites (which can be obtained, if necessary, by any set of conventional GPS receivers able to obtain GPS data from all satellites, located anywhere in the world) to compute the location of the wireless device. The Döppler-shift information allows the pseudorange ambiguity to be resolved by Döppler navigation means.

The only relative timing information required between the wireless device and the facility processing the pseudorange and satellite ID information into a geolocation, is the TOD at which the pseudorange data was measured. Depending on the specific application, most commercial applications require only modest time resolution between one to ten milliseconds.

BRIEF DESCRIPTION OF THE DRAWINGS

Preferred embodiments of the present inventions are described with reference to the following drawings, wherein.

DETAILED DESCRIPTION OF PREFERRED EMBODIMENTS

Each GPS satellite transmits a unique signal that consists of a 1575.42 MHz sinusoidal carrier signal biphase, modulated by two pseudo random biphase signals. The biphase signals include: (i) the unique Course Acquisition Code ("C/AC") of the satellite, referred to herein as the "Gold Code" of the satellite, with the 1.023 MHz "chipping" rate, resulting in the spreading of the majority of the signal's energy over approximately 2.046 MHz; and (ii) in quadrature, a Precision Positioning Code ("PPC") at a 10.23 MHz chipping rate, spreading the resulting modulation over 20.46 MHz. For the purpose of this application, the PPC will be ignored. Further, the basic C/AC sequence-length is 1023 chips, resulting in a repeat of the Gold Code sequence exactly every millisecond. Satellite message data is modulated on this basic scheme by inverting the modulation code sequence phase according to the message data at a message data rate of 50 bits per second. Thus, the code sequence repeats at least 20 times before it may change due to data-bit changes.

Figure 1:
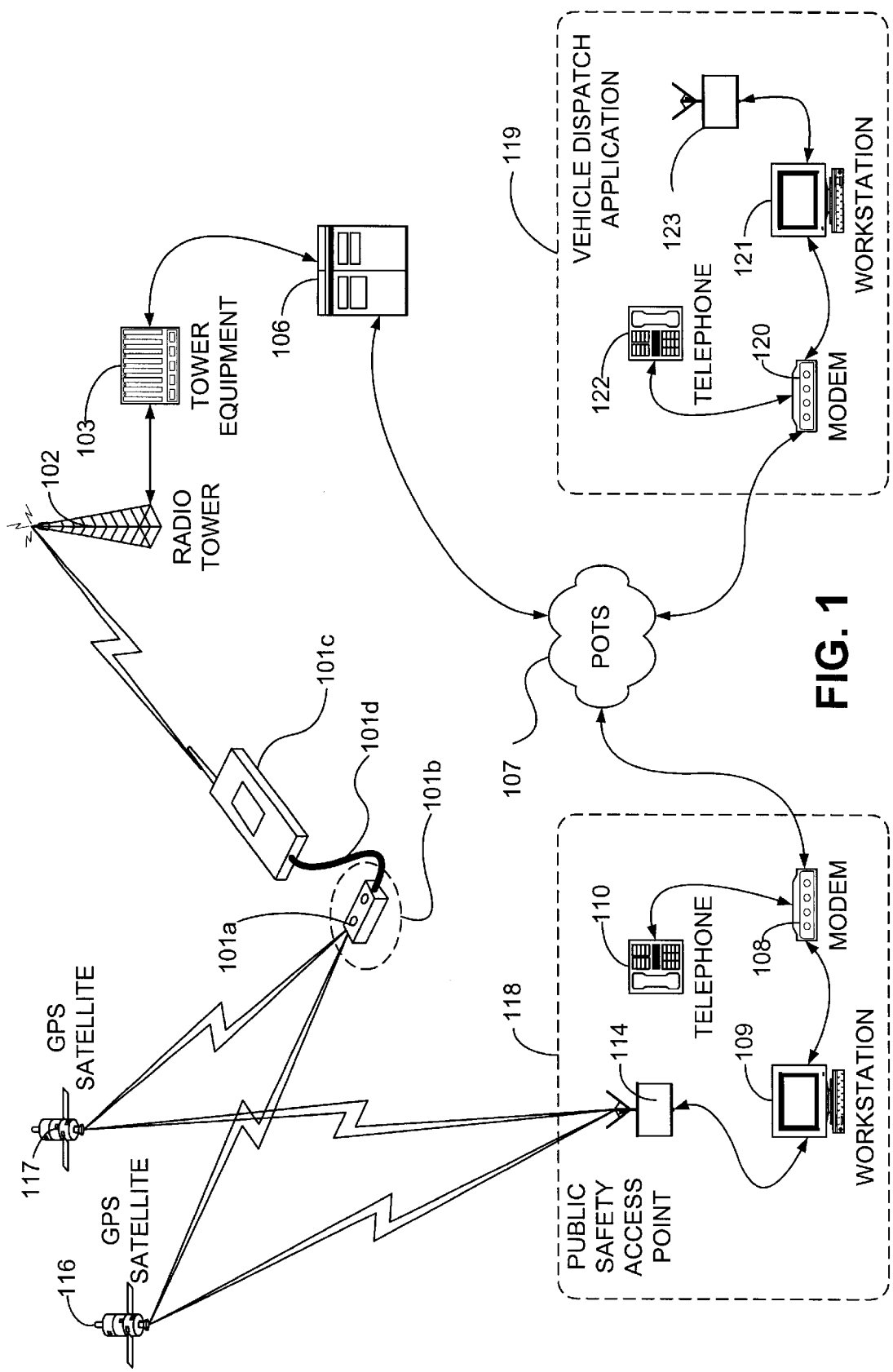
FIG. 1 is a block diagram illustrating a preferred embodiment of the essential components of the system for locating the wireless device by the method of the present invention.

Referring now to FIG. 1, a block diagram of a remote geolocation system is shown. GPS satellites 116 and 117 are coupled to a geolocating accessory 101b. The geolocating accessory 101b is connected to a wireless device 101c. The wireless device 101c is coupled via a wireless link to a radio tower 102.

Radio tower 102 is coupled to tower equipment 103. Tower equipment 103 is coupled to wireless network management equipment 106. The wireless network management equipment 106 is coupled to Plain Old Telephone System (POTS) 107. The POTS 107 is coupled to application sites, such as, by way of example only, a vehicle dispatch site 119 or a Public Safety Access Point (PSAP) 118.

The PSAP 118 comprises a modem 108, which is connected to the POTS 107. The modem 108 is coupled to a telephone 110 and a workstation 109. The workstation 109 is also coupled to a receiver 114. The receiver 114 is also coupled to the GPS satellites 116 and 117.

The vehicle dispatch site 119 comprises a modem 120, which is connected to the POTS 107. The modem 120 is also coupled to a telephone 122, and a workstation 121. The workstation 121 is also coupled to a receiver 123. The receiver 123 is coupled to the GPS satellites 116 and 117 (coupling not shown in Figure).

The GPS satellites 116 and 117 are GPS satellites capable of transmitting GPS signals. The wireless device 101c may be any type of wireless device capable of wireless communication and transferring timing information (TOD) to the ranging-receiver. For example, it may be a cellular telephone, wireless Personal Digital Assistant, two-way or response pager, private or commercial vehicle tracking system, "On-Star" type motorist service network, or a private or commercial wireless data network (or a device in these networks). Other types of wireless devices are possible.

The wireless device 101c may be coupled to the geolocating accessory 101b (containing a GPS ranging-receiver), as described below in reference to FIG. 2a. The geolocating accessory 101b may be attached to the wireless device 101c by a dongle cable 101d. Alternatively, the geolocating accessory 101b may be attached to the body of the wireless device 101c as a "stick-on" attachment or built into a receptacle, thereby making the electrical contact with the wireless device when it is inserted into the receptacle. Alternatively, the geolocating ranging-receiver's functionality may be integrated into the wireless device design 101c (described in reference to FIG. 2b).

The radio tower 102 is any type of tower having antennas, which are capable of transmitting and receiving wireless communication signals. For example, they may be standard cellular towers having cellular communication antennas. The tower equipment 103 contains functionality, such as transceivers, which receive and send transmissions from the radio tower 102.

The wireless network management equipment 106 includes processes, which route communications to and from the tower equipment 103. In addition, the wireless network management equipment 106 provides connectivity to the POTS 107.

The PSAP 118 manages emergency services. Within the PSAP, receiver 114 receives signals from the GPS satellites 116 and 117. The receiver 114 processes the signals, for example, for ephemeris data, from the GPS satellites 116 and 117. The workstation 109 is used by operators to monitor emergency calls. The workstation 109 also determines the location of the wireless device 101c based on information exchanged with the geolocating accessory 101b via the wireless device 101c. The telephone 110 allows the operator to call the wireless device 101c or respond to the incoming call when called. The modem 108 is a modem capable of interacting with the POTS 107 and the geolocating accessory 101b. The modem 108 provides a data exchange capability and time-exchange facility with the geolocating accessory 101b via the wireless device 101c over the same voice channel as used by the caller to speak to the PSAP operator.

The vehicle dispatch site 119 manages vehicle-dispatching services. Within the vehicle dispatch site 119, receiver 123 receives signals from the GPS satellites 116 and 117. The receiver 123 processes the signals, for example, for ephemeris data, from the GPS satellites 116 and 117. The workstation 121 is used by operators to monitor communications with wireless devices. The workstation 121 also determines the location of the wireless device 101c based on information exchanged with the geolocating accessory 101b. The telephone 122 allows an operator to call the wireless device 101c. The modem 120 is a modem capable of interacting with the POTS 107 and the geolocating accessory 101b. The modem 120 provides data exchange capability and a time-exchange facility with the geolocating accessory 101b via the wireless device 101c over the same voice channel as used by the caller to speak to the operator of the workstation 121.

An activity requiring a geolocating fix or sometimes referred to as a "position fix" can be initiated at either end of the wireless link (e.g., at the wireless device 101c or at the vehicle dispatch site 119 or PSAP 118). For example, a user of the wireless device 101c may initiate a call to the PSAP 118 to obtain emergency assistance at the location of the wireless device 101c. Alternatively, the application at the vehicle dispatch site 119 or an operator at the PSAP 118 may initiate a call to the wireless device 101c to determine the current location of the wireless device.

If the activity is initiated at the wireless device 101c, the caller at the wireless device 101c dials the telephone number of the PSAP 118, such as "911". The PSAP operator answers the call with the telephone 110 and the PSAP operator then instructs the user to depress a "LOCATE" button 101a on the geolocating accessory 101b to begin the geolocating process. In an alternate embodiment, the caller at the wireless device dials the number of the vehicle dispatch site 119. In yet another embodiment, the application (e.g., the application from the vehicle dispatch site 119) initiates a call to the wireless device, which may be set up to automatically answer the call and initiate the geolocating process in the geolocating accessory 101b.

The workstation 109, using current ephemeris data continuously received from a conventional GPS receiver 114, which has a clear view of the GPS satellites, computes the location of the caller, enabling the PSAP operator to dispatch help to the caller.

If activity is initiated at the PSAP 118 or the vehicle dispatch site 119, the dispatcher at the PSAP 118 or the vehicle dispatch site 119 initiates a call via modem 108 or 120 to the wireless device 101c. The user at the wireless device 101c answers the call, and activates the geolocating accessory 101b starting a geolocating function in the ranging-receiver, which estimates the geolocating data from the satellite signals. The wireless device 101c may also automatically answer the call and initiate the locating process in the geolocating accessory 101b.

In determining the tracking information, the geolocating accessory 101b digitizes the GPS satellite signals presently being received by the geolocating accessory 101b. Next, the geolocating accessory 101b processes the digitized signals to obtain a set of satellite ID information, Doppler-error and pseudorange data. Via an exchange of timing signals with the vehicle dispatch site 119 or PSAP 118 over the audible channel of the wireless device 101c, the geolocating accessory 101b determines the TOD at which the measurement was made. Next, the geolocating accessory 101b sends this data, via the same audible channel of the wireless device 101c (the same channel as that which the verbal conversation takes place,) to the workstation 121 via the modem 120 or the workstation 109 via the modem 108.

The workstation 109 or 121, using current ephemeris data continuously received from a conventional GPS receiver 114 or 123, each of which has a clear view of the GPS satellites, computes the location of the caller, enabling the PSAP operator or the operator of the workstation 121 to dispatch help or take appropriate action. The workstation 109 or 121 may display the location on a dispatch map, thereby assisting the dispatcher or operator to take appropriate action.

Figure 2A:
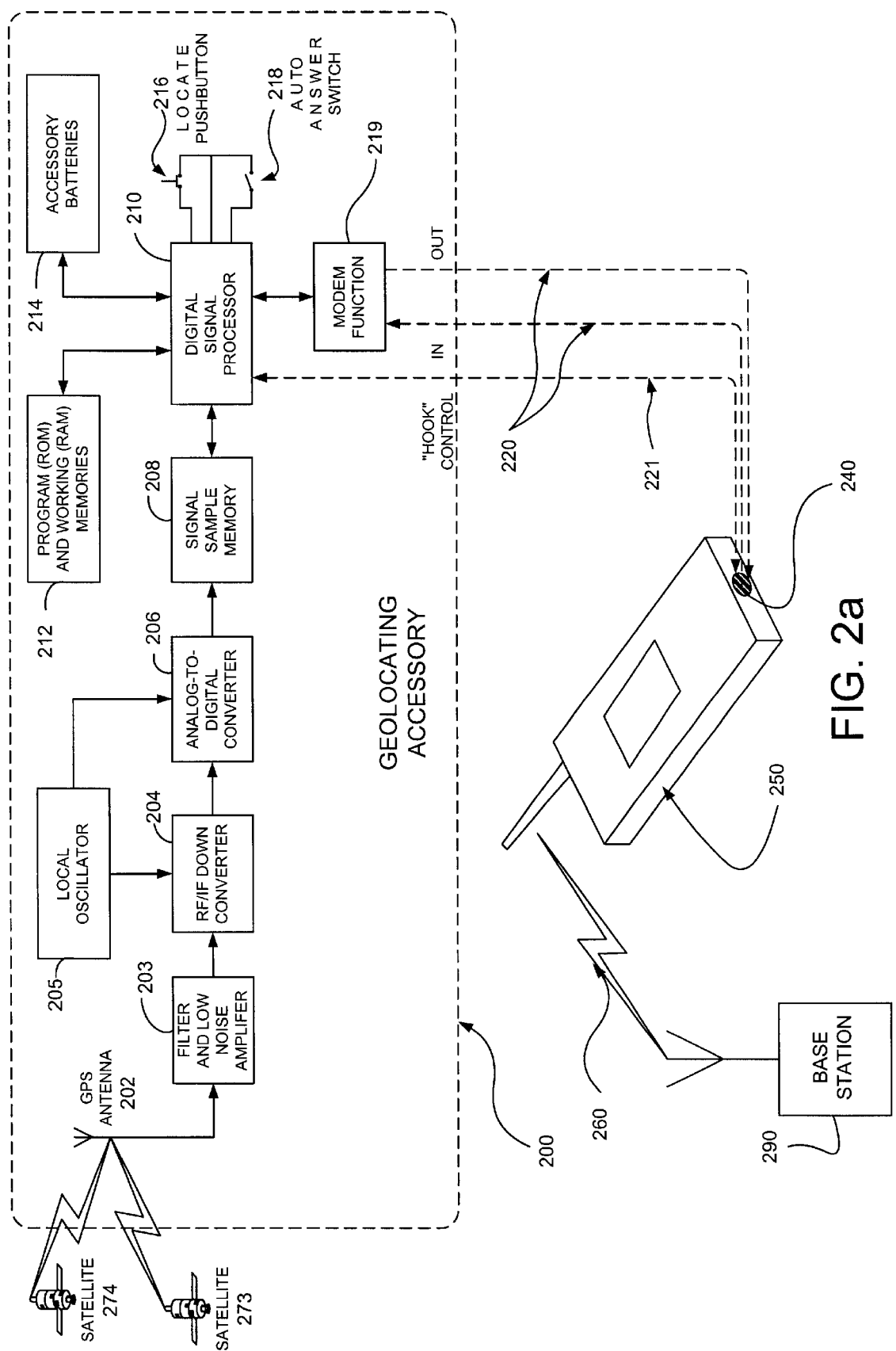
FIG. 2A is a block diagram illustrating a GPS geolocating accessory in accordance with a preferred embodiment of the present invention, such GPS geolocating accessory embodying a ranging-receiver and its interaction with a wireless device, in this case, by way of example, a typical digital cellular telephone.

Referring now to FIG. 2a, a block diagram of a geolocating accessory 200 connected to a wireless device 250 is shown. In this case, a digital cellular telephone is used by way of example.

The GPS satellites 273 and 274 are coupled to a GPS antenna 202. The GPS antenna 202 is coupled to a filter and low noise amplifier 203. The filter and low noise amplifier 203 is coupled to a RF/IF down converter 204. The RF/IF down converter 204 is coupled to an analog-to-digital converter 206. The analog-to-digital converter 206 is coupled to a signal sample memory 208. The signal sample memory 208 is coupled to a digital signal processor (DSP) 210. A local oscillator 205 is coupled to the RF/IF down converter 204 and the analog-to-digital converter 206.

The DSP 210 is coupled to a push button 216, auto answer switch 218, program (ROM) and working (RAM) memories 212, accessory batteries 214, and a modem function 219. The DSP 210 also has a control line 221, which is coupled to the wireless device 250 at a connector 240. The modem function 219 has control lines 220, which are coupled to the wireless device 250 at the connector 240. The wireless device 250 is coupled to a base station 290 via a wireless link 260.

The GPS satellites 273 and 274 are GPS satellites capable of transmitting GPS signals. The wireless device 250 may be any type of wireless device capable of wireless communication. For example, it may be a cellular telephone, wireless Personal Digital Assistant, two-way or response pager, private or commercial vehicle tracking system, "On-Star" type motorist service network, or a private or commercial wireless data network (or a device in these networks). Other types of wireless devices are possible.

The GPS antenna 202 is any antenna capable of receiving GPS signals, for example a circularly polarized ceramic patch antenna. The filter and low noise amplifier 203 is a combination of a filter and a low-noise amplifier. In one example, the filter and low noise amplifier 203 limits signals bandwidth to approximately 2 MHz (centered at 1575.42 MHz). The signal is down-converted to baseband by the RF/IF down convertor 204. The analog-to-digital converter 206 is any type of device that digitizes analog signals received from the RF/IF down converter 204. For example, the analog-to-digital converter 206 may digitize the signals at a minimum of 2 megasamples per second, but more typically 4 megasamples per second or 8 megasamples per second to improve timing resolution, and then further into 1 bit or 2 bit, in-phase and quadrature-phase (I/Q) samples.

The DSP 210 is a processor capable of processing stored instructions. For example, the DSP 210 may be a Motorola DSP 56654 manufactured by Motorola, Inc. of Schaumburg, Ill. or a Texas Instrument TMS 320VCSS10 manufactured by Texas Instruments of Dallas, Tex. Other examples are possible.

The program and working memories 212 is a combination of ROM and RAM memories. However, other types of memory and other combinations are possible.

The local oscillator 205 is any type of oscillator used to drive digital devices. For example, the local oscillator 205 may be a temperature compensated crystal oscillator (TCXO) or digitally compensated crystal oscillator (DCXO). Other oscillator types are possible.

The signal sample memory 208 is any type of memory used to temporarily store digital signal samples. For example, it may be a RAM memory. However, other memory types are possible. The modem function 219 provides an interface whereby communications are transmitted between the DSP 210 and the wireless device 250. The accessory batteries 214 provide power to the geolocating accessory 200.

In operation, the geolocating accessory 200 may be activated either by signals arriving via the wireless link (if the auto-answer switch is enabled) or, alternatively, by pressing the push button 216. In either case, the DSP is activated.

The GPS signals are received from the GPS satellites 273 and 274 are combined at the GPS antenna 202. The combined signal is band-limited by the filter and low noise amplifier 203. Next, the signal is superhetrodyned in the RF/IF down converter 204. Specifically, the filtered signal is down-converted to an offset IF frequency by the RF/IF down converter 204 using the heterodyning frequency provided by the local oscillator 205. The RF signal, now near base-band, is then digitized by the analog-to-digital converter 206.

After being digitized, the samples may be stored in the signal sample memory 208 for processing. This processing includes extraction of the Döppler-error. For example, the IF signal may be sampled at a rate of at least 2.024 Ms/s by the analog-to-digital converter 206 which may store the digital samples in the signal sample memory 208 or begin decimation processing. This sample rate ensures at least 2 I/Q samples per pseudo random noise (PRN) code chip, which PRN code modulates at 1.023 MHz. While the samples are being processed in the signal sample memory 208, the DSP 210 performs a timing handshake with the geolocating workstation to establish an accurate TOD for the time of pseudorange measurement.

Intermediate results of the processing may be stored in the program and working memories 212. The DSP 210, operating on instructions contained in the program (ROM) and working (RAM) memories 212, processes the samples to obtain the GPS signal carrier frequencies including the Döppler-errors, compensates for the Döppler-errors and for Döppler-induced time errors, obtains the pseudorange and satellite ID for each satellite found, communicates the tracking information through the modem function 219 and the control lines 220, coupled to the wireless device 250, which then communicates via the wireless link 260 to the base station 290. The DSP 210 manages the power consumption from the accessory batteries 214 during this process and returns the wireless device to "standby" operation when the geolocating operation is complete.

The geolocating accessory 200 communicates with the wireless device 250 via the "hands free" audio signal lines 220 and "hook control" line 221. The signal lines are coupled to connector 240. The wireless device 250 communicates with the base station 290 and transmits the tracking information such that the geolocation will be calculated.

Figure 2B:
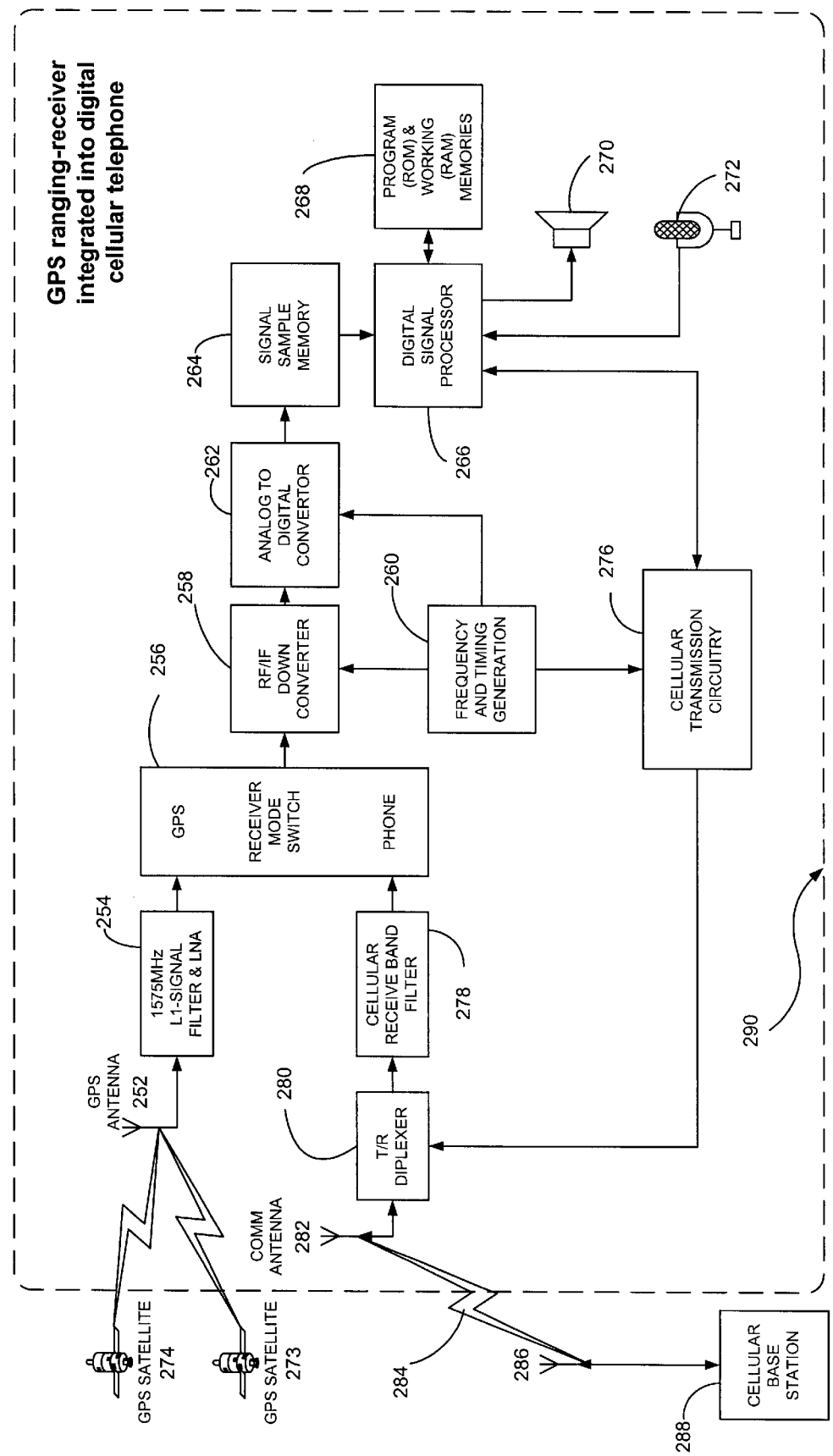
FIG. 2B is a block diagram illustrating the GPS ranging-receiver function in accordance with a preferred embodiment of the present invention, such GPS ranging receiver function being integrated with a wireless device, in this case, by way of example, a typical digital cellular telephone.

Referring now to FIG. 2b, a GPS ranging-receiver integrated into a wireless device 290 is illustrated. In this case, a digital cellular telephone is used by way of example.

The GPS satellites 273 and 274 are coupled to a GPS antenna 252. The antenna is coupled to a filter and low noise amplifier 254. The filter and low noise amplifier 254 is coupled to a receiver mode switch 256. The receiver mode switch 256 is coupled to an RF/IF down converter 258. The RF/IF down converter 258 is coupled to an analog-to-digital converter 262. The analog-to-digital converter 262 is coupled to a signal sample memory 264. The signal sample memory 264 is coupled to a digital signal processor (DSP) 266.

The DSP 266 is coupled to program and working memories 268, a speaker 270, a microphone 272, and cellular transmission circuitry 276. The frequency and timing generator 260 is coupled to the RF/IF down converter 258, the analog-to-digital converter 262 and the cellular transmission circuitry 276. The cellular transmission circuitry 276 is coupled to the T/R diplexer 280. The T/R diplexer 280 is coupled to a communication antenna 282 and a cellular receive band filter 278. The cellular receive band filter 278 is coupled to the receive mode switch 256. A base station 288 is coupled to the antenna 286.

The GPS satellites 273 and 274 are GPS satellites capable of transmitting GPS signals. The wireless device 290 may be any type of wireless device capable of wireless communication and transferring timing information (TOD) to the ranging-receiver. For example, it may be a cellular telephone, Personal Digital Assistant, two-way or response pager, private or commercial vehicle tracking system, "OnStar" type motorist service network, or private and commercial wireless data networks (and devices in these networks). Other types of wireless devices are possible.

The GPS antenna 252 is any antenna capable of receiving GPS signals, for example a circularly polarized ceramic patch antenna. The filter and low noise amplifier 254 is a combination of a filter and a low-noise amplifier. In one example, the filter and low noise amplifier 254 limits signals to approximately 2 MHz. The analog-to-digital converter 262 is any type of device that digitizes analog signals received from the filter and low-noise amplifier. For example, the analog-to-digital converter 262 may digitize the signals at a minimum of 2 megasamples per second.

The DSP 266 is a processor capable of processing stored instructions. For example, the DSP 266 may be a Motorola DSP 56654 manufactured by Motorola, Inc. of Schaumburg, Ill. or a Texas Instrument TMS 320VCSS10 manufactured by Texas Instruments of Dallas, Tex. Other examples are possible.

The program and working memories 268 is a combination of ROM and RAM memories. However, other types of memory and other combinations are possible.

The frequency and timing generator 260 is any type of oscillator used to drive digital devices. For example, the frequency and timing generator 260 may be a TCXO or DCXO. Other types of frequency and timing devices are possible.

The signal sample memory 264 is any type of memory used to temporarily store signal samples. For example, it may be a RAM memory. However, other memory types are possible.

The cellular transmission circuitry 276 converts the voice information received from the DSP 266 and formats it into wireless signals for transmission through the T/R diplexer 280 and communication antenna 282. The cellular receiver mode switch 256 switches either GPS or cellular signal into the rest of the receiver. The cellular receive band filter 278 only accepts incoming signals in the cellular receive frequency band. The T/R Diplexer 280 isolates the transmitter output signals from the cellular receiver and allows a single communication antenna (i.e., the communication antenna 282) to serve both the transmit and receive functions.

The wireless device 290 operates in one of two modes: a phone mode or a GPS mode. The mode is selected by the DSP 266, by setting the receiver mode switch to the appropriate position.

When in phone mode, the wireless device 290 receives the wireless signals from the communication antenna 282. The received signals are passed by the T/R diplexer 280, and accepted by the cellular receive band filter 278. Then, the signals are passed through the receiver mode switch 256 (set in the "phone" position), down-converted (by superhetrodyning) in the RF/IF down converter 258 with the local oscillator (LO) frequency supplied by the frequency and timing generator 260. Then, the received signals are converted to digital signal samples via the analog-to-digital converter 262. The samples are then processed through the signal sample memory 264 into voice and control signals by the DSP 266 according to instructions retrieved from the program and working memories 268 to create sound from the speaker 270.

Sound signals from the microphone 272 are converted to digital signals and suitable modulation under the control of the DSP 266 and transmitted via the cellular transmission circuitry 276 through the T/R diplexer 280 and the communication antenna 282.

When the receiver mode switch 256 is in the "GPS" position, the receiving side of the equipment can process the GPS signals being received by the circularly polarized GPS antenna 252.

When the DSP 266 detects a triggering request either in the message/data stream flowing through the digital demodulator, typically implemented in the DSP 266, or via a depression of the LOCATE push button or a combination of push buttons (not shown in FIG. 2b), it first performs a timing-handshake with the base station 288, (or obtains time from the network, if available), and then starts processing samples through the signal sample memory 264. This differs from what can occur when using the geolocating accessory 200, since the accumulation/processing of samples in the geolocating accessory 200 can take place at the same time as the timing-handshake is taking place. Other activation mechanisms, both manual and automatic, are possible.

Once the timing-handshake has been completed, the DSP 266 turns power on to the GPS antenna 252 and to the filter and low noise amplifier 254. Then, the DSP 266 switches the receiver mode switch 256 to pass the GPS signals, and changes the frequency and timing generator 260 to provide the heterodyning frequency for the GPS signal. Next, the DSP 266 begins to accumulate/process GPS signal samples through the signal sample memory 264. The DSP 266 also begins to count time, so that at a later stage in the process, it can relate the time that the sample was being taken, to the TOD established by the handshake process.

The GPS Antenna 252 receives the combined signals from all GPS satellites "in-view". The filter and low noise amplifier 254 selects the particular 2 MHz bandwidth occupied by the C/AC modulated GPS signals. The filtered signal is converted to IF frequencies by the RP/IF down converter 258 using the heterodyning LO frequency provided by the frequency and timing generator 260. Next, the IF signal is sampled by the analog-to-digital converter 262 at a sampling rate; for example, at a rate of at least 2.048 MS/s or higher multiples thereof. The analog-to-digital converter 262 may store the digital samples in the signal sample memory 264, or begin processing immediately. The DSP 266, operating on instructions contained in the program and working memories 268, and when not busy collecting GPS signal samples, processes the samples to obtain the Doppler-errors from the GPS signals, compensates for the time and frequency-offsets, obtains the pseudorange and satellite ID for each satellite found, and communicates the tracking information via the wireless link 284 to the remote geolocating workstation.

The DSP 266 also manages the device power requirements, the switching between GPS and two-way signals as needed during this process and returns the cellular telephone to "cellular" operation when the ranging operation is complete.

Since the DSP 266 in this case may have access to network timing information, TOD information may be obtained either by completing a timing handshake via the wireless link, or by obtaining it from the network timing data stream.

After processing the signal samples in memory for all Doppler-error, satellite ID and pseudorange data, the results are sent via the wireless network link to the remote site where the geolocation of the wireless device 290 is computed.

Figure 3:
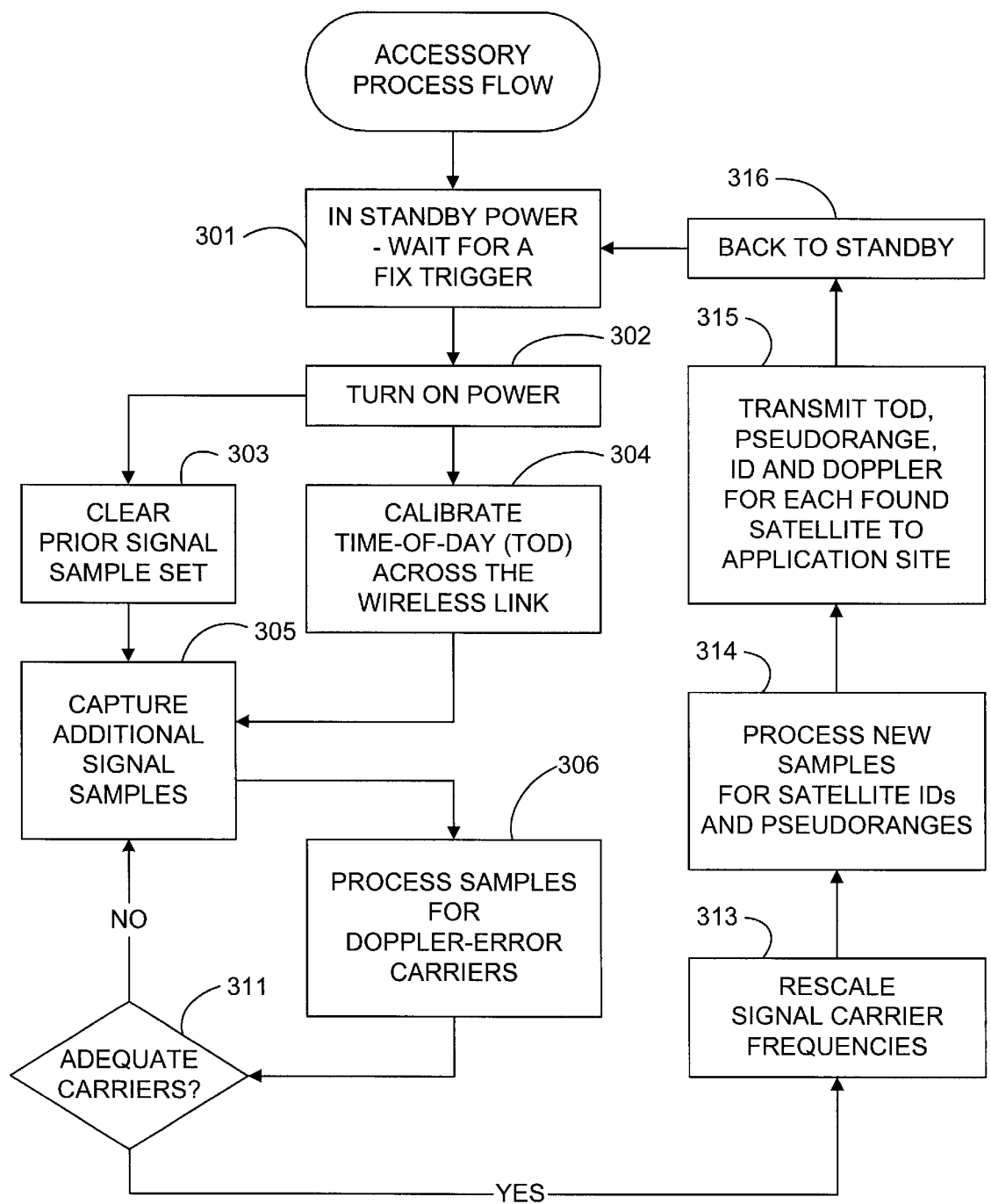
FIG. 3 is a flowchart for the operation of the geolocating accessory.

Referring now to FIG. 3, a flow diagram of the operation of the geolocating accessory is described. The process begins when an event trigger at step 301 enables the ranging-receiver, causing power to be turned on to the necessary circuitry at step 302. The process initializes at step 303 by clearing any prior data from the digitized sample memory. Simultaneously, at step 304, the timing-handshake operation is performed to determine the TOD.

The timing handshake consists of the ranging-receiver noting the local time-of-day, $L_{TOD}$ (the time-of-day according to the local clock in the ranging-receiver), and sending a timing tone signal to the remote geolocating workstation, which measures the time of its arrival by a standard TOD clock (a clock accurately synchronized with either a standard clock, such as that at the National Bureau of Standards in Colorado, or timing derived from signals transmitted by the GPS satellites). After a standard delay, the geolocating workstation transmits a responding timing tone signal to the ranging-receiver, which also measures its time of arrival by its local TOD clock. Immediately following the timing tone, the remote geolocating workstation sends to the ranging-receiver the standard TOD at which the timing tone was received by the geolocating workstation and the duration of the standard delay.

On the presumptions that the timing tone transmission delays are the same in both directions, and that they are stationary (i.e., invariant with time), then, from these respective TOD measurements, the ranging-receiver computes the calibrated Local TOD as:

$$CL_{TOD} = S_{TOD} - \tfrac{1}{2}(R_{TOD} - T_{TOD} - SD)$$

where:

$CL_{TOD}$ is the Calibrated Local Time-Of-Day;

$S_{TOD}$ is the Standard Time-Of-Day;

$R_{TOD}$ is the Un-calibrated Received Time-Of-Day;

$T_{TOD}$ is the Un-calibrated Transmitted Time-Of-Day; and

SD is the Standard Delay.

Given that these measurements are made on signals with good signal-to-noise ratios in the voice/audio channel signals, it is easy to make all of these TOD measurements with a resolution of better than one millisecond.

If either of the presumptions above is not true (i.e., the delays are not stationary or that the delays are not the same in both directions), then the best that can be achieved with multiple two-way timing measurements is an accuracy of one half of the long-term bias.

Next, at step 305, in the case of the geolocating accessory, the GPS signal samples from the analog-to-digital converter are captured.

The carriers are extracted at 306 (detailed in relation to FIG. 4 below) and tested at 311. If too few carriers are found at 311, additional digital samples are added to the analysis ensemble at 305, and this process continues till adequate carriers are found at 311.

Once the adequate carrier components have been extracted from the noise, they are rescaled at step 313 into the actual signal carriers. The actual Döppler-error frequency results can be used to compensate for frequency and time errors in either new samples or saved samples in the signal sample memory (since the Döppler-error compensation information will change little within the few seconds of the analysis processes, then the trade-off between new/old samples may be chosen on a basis of memory economics). The compensation results can then be used in the processes to determine both the satellite IDs and pseudorange, for example, by signal averaging and Fourier transform correlation processes at step 314. Once the pseudoranges and satellite IDs are known, they are transmitted at step 315 to the remote geolocating workstation, along with the found Döppler-errors and $CL_{TOD}$ measurement information, so that the actual geolocation of the receiver can be calculated. Once the results have been transmitted, the geolocating accessory power is cycled down to standby power at step 316.

Figure 4:
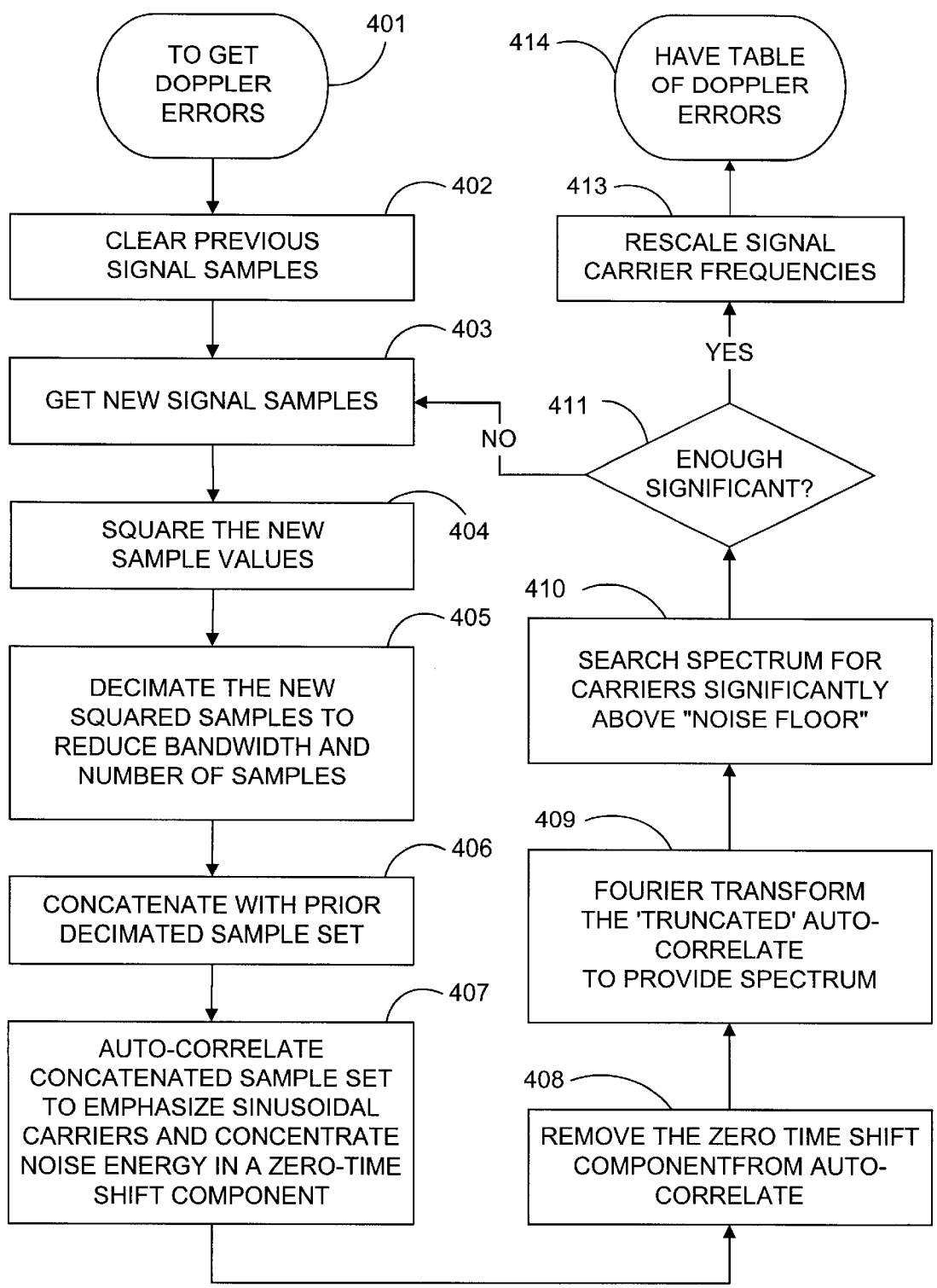
FIG. 4 is a flowchart of the Döppler-error extraction process in accordance with a preferred embodiment of the present invention.

Referring now to FIG. 4, the Döppler-error extraction process is described. The process to get Döppler-errors begins at 401. Next, at step 402, any previous signal samples are cleared from the signal sample memory (memory pointer set to the beginning). Then, at step 403, new samples are obtained from the analog-to-digital converter (the analog-to-digital converter 206 in FIG. 2a or the RF/IF down converter 258 in FIG. 2b). The new samples are squared at step 404 to remove the biphase ranging code modulation.

The signal samples are squared to remove the biphase pseudo random noise (PRN) code modulation on the GPS signal carriers.

The squaring removes the biphase modulation as follows. Consider the case of three satellite signals. If x, y, and z represent the biphase PRN Gold Code modulation for three different satellites' signals, and a, b and c are the carrier frequencies of the respective signals being received by the GPS receiver, then:

$$x \; \text{Cos}[a] + y \; \text{Cos}[b] + z \; \text{Cos}[c]$$

is representative of the received signal. On squaring the signal, the result is in the form:

$$\tfrac{1}{2}(\text{i } x^2+y^2+z^2+x^2 \text{Cos}[2a]+y^2 \text{Cos}[2b]+z^2 \text{Cos}[2c]+2xy(\text{Cos}[a+b]+\text{Cos}[a-b])+2xz(\text{Cos}[a+c]+\text{Cos}[a-c])+2yz \; (\text{Cos}[b+c]+\text{Cos}[b-c]))$$

i.e. a "*DC*" (zero frequency) term   $x^2 + y^2 + z^2$ a double frequency set   $x^2\text{Cos}[2a] + y^2\text{Cos}[2b] + z^2\text{Cos}[2c]$ and an intermodulation set   $2xy(\text{Cos}[a + b] + \text{Cos}[a - b]) +$
$2xz(\text{Cos}[a + c] + \text{Cos}[a - c]) +$
$2yz(\text{Cos}[b + c] + \text{Cos}[b - c])$ It will be noticed that the double frequency set has its modulation collapsed, since $x^2$ or $y^2$ or $z^2$ is either $(+1)^2$ or $(-1)^2$, which in either case is equal to +1. Meanwhile, the intermodulation set is still "spread", but now by the product of two different Gold Codes (e.g., xy or xz or yz).

Therefore from the above discussion we can see that squaring the signal does "collapse" the biphase modulation in the case of the double frequency terms, but mixes the intermodulation signals into many $(N^2-N)$ "doubly-spread" sum and difference frequencies.

At step 405, the squared samples are then decimated in a narrow bandwidth filtering process resulting in an improvement in signal-to-noise ratio; and a reduction in the number of samples to be frequency analyzed for carrier components by Fourier transform methods. The decimation filter is used: (i) to reduce the bandwidth of the samples from the sampled 2.048 MHz to the bandwidth of the Döppler-shift plus local oscillator frequency uncertainty bandwidth (typically less than 10 KHz); and (ii) to reduce the number of samples to be used in the analysis for frequency components. The decimation typically results in an immediate signal-to-noise ratio improvement of about 20 db, and a 100:1 contraction of the size of the sample to be Fourier transformed. This decimation filtering, well known in the art, can be accomplished in a number of ways, for example, by weighting and summing approximately one hundred "input" samples (depending on decimation filter design) into a single "output" result, then doing the same weighting and summing on a subsequent batch of the same number of samples, and so on through the set of samples, or by means of Cascades Integrator Comb filters, which do not require the multiplication steps. Other methods are possible.

At step 406, these squared and decimated samples are concatenated with any prior squared and decimated samples (none, when the process is started anew).

The frequency analysis begins at step 407 where the current decimated sample set is auto-correlated to emphasize the sinusoidal carriers, and to concentrate much of the noise energy of the auto-correlate in the on-time (the "zero-time-shift") component of the auto-correlation result. The zero-time-shift component is removed ("truncated") at 408 (removing significant noise energy from the auto-correlation), and then the truncated auto-correlation result is again Fourier transformed to obtain the frequency components of the truncated auto-correlation at step 409. The resulting frequency spectrum is then searched at step 410 for potential carrier components significantly above the noise background. If there are too few or no candidate components, or if the candidates are only marginally above the noise background at step 411, then the process begins to add more samples to the analysis (thereby reducing the bandwidth of the analysis and of the now longer time-series of digitized samples) by looping back from steps 411 to 403 to add new samples from the signal sample memory, or, in another embodiment, from the analog-to-digital converter. If sufficient carrier component candidates are found at step 411, then the double-frequency components are rescaled (measured frequency is divided by 2 to account for the doubling in frequency produced by the squaring step) to give the frequency to be used for: (i) the Döppler-errors correction prior to the correlation processes used to determine both pseudorange and satellite ID; and, (ii) the Döppler-induced time error correction after the first Fourier transform performed during the correlation process, in preparation for signal averaging, if used. At step 414, a set of Döppler-error values to be used for corrections exists.

Figure 5:
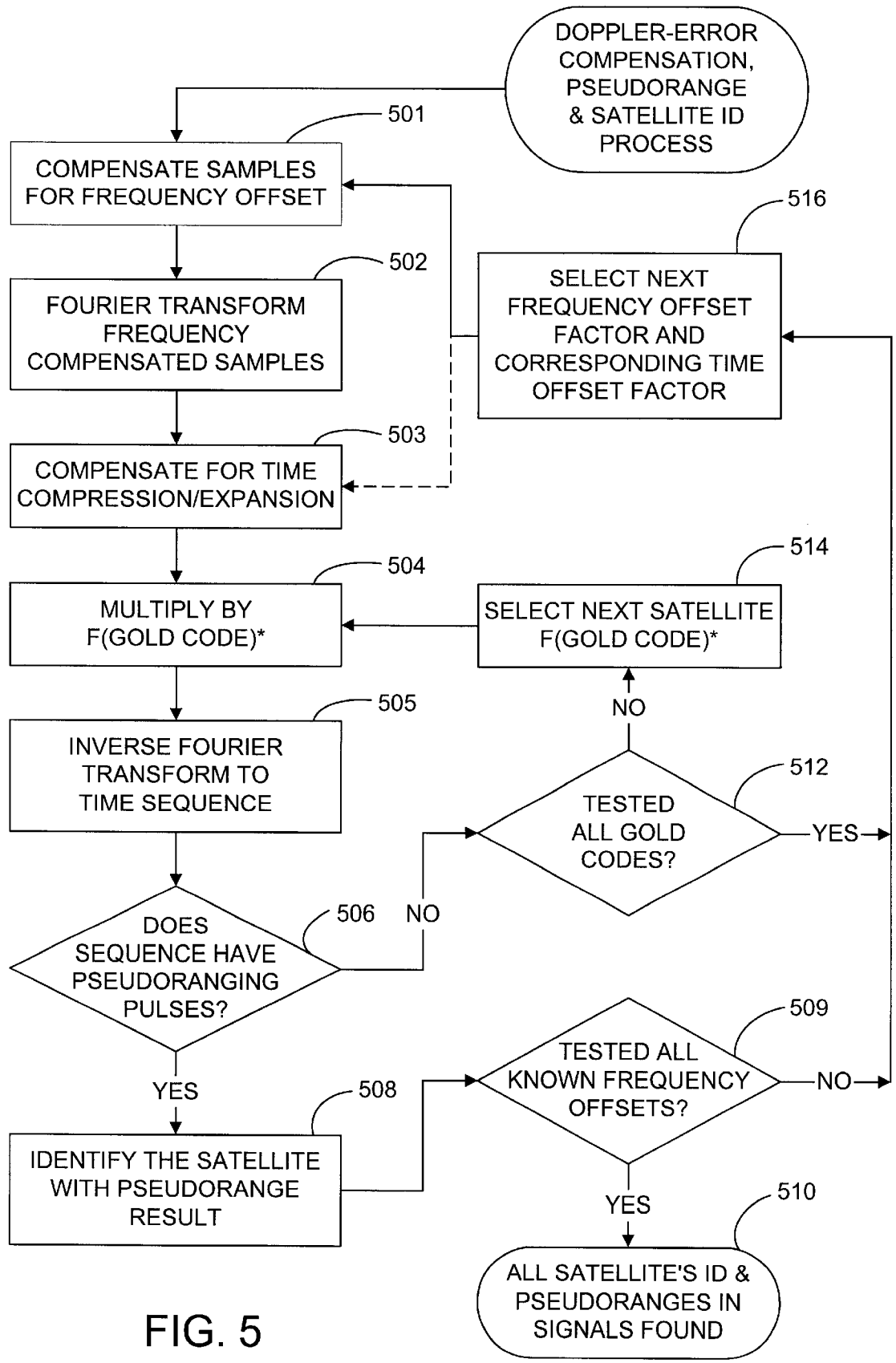
FIG. 5 is a flowchart of the processes for Döppler-error compensation, satellite identification and the pseudorange estimation from the satellite signal sample.

Referring now to FIG. 5, the Döppler-error compensation, satellite identification and pseudorange determination process is now described. In one embodiment, a table contains the complex-conjugates of the Fourier transforms of the Gold Codes, sampled at the same rate as the digitized signal samples. Each of the complex-conjugates of the Fourier transform of a Gold Code is represented by an F[N] (a vector in the "F table"), where N is some index value (e.g., the Gold Code number in the range of 1 to 32 and equal to the satellite ID number) and is stored in permanent memory.

At step 501, either the digitized signal samples being collected, or those samples already in the signal sample memory, are compensated for the Döppler-errors by frequency shifting in the time domain by the frequencies determined from the Döppler-error extraction process above. A set of frequency compensated digitized samples is created for each Döppler-error value, by multiplying each complex digitized sample by a complex "despinning vector" equal to:

$$F(n)=e^{-j2\pi n T f_d}$$

where:

$f_d$ is the current Döppler-error frequency
(e.g., somewhere between −10 kHz and +10 kHz as found);

T is the decimated sampling period (e.g. a hundred milliseconds); and n is the sample number variable.

In one embodiment, multiple Gold Code segment length sequences of these Döppler-error compensated samples are stacked for the purpose of signal averaging. The number of such Gold Code length that can be effectively stacked is limited by the 50 bit/second ephemeris data modulated on the phase of the Gold Code sequences to less than 20 (typically between 4 and 10).

At step 502 the Döppler-error compensated sample sets (which may be stacked or not stacked) are Fourier transformed as a prelude to the Döppler-induced time error compensation and correlation processes. At step 503, the Döppler-induced time error samples are compensated by multiplying the Fourier transform components by a complex exponential factor to shift the time in the frequency domain.

The exponential factor is:

$$T(n)=e^{-j2\pi n d/T_f}$$

where:

d is the current Döppler-error induced time-shift error per analysis frame;

$T_f$ is the analysis interval, e.g. 1 millisec per code frame; and n is the frequency step variable.

The exponential factor may be recovered from the pre-computed table or computed at the time it is applied. At step 504, the Döppler-errors compensated samples are multiplied by the Fourier transform of the candidate satellite's Gold Code, stored in F[n]. This result is inverse Fourier transformed at step 505 to give the time series of the correlation of the Döppler-error compensated satellite signal samples and the candidate satellite's Gold Code. These results may also be stacked to improve the signal-to-noise ratio.

If, at step 506, pseudoranging pulses are not found in this result, then execution continues at step 512 to explore further trial Gold Codes; else the pseudorange is associated with the satellite ID implied by the specific trial Gold Code in step 508.

If at step 512 all Gold Codes have been tested, then execution loops back to 516, where the next frequency-offset factor and corresponding time offset factor are selected, and execution continues at 501, else the process loops back to 514 to explore the next Gold Code from the F[n] table by selecting a new code from the F table and continuing the process at step 504.

At step 508, the satellite can be identified since the candidate code at F[n], which implies a particular satellite, has matched the satellite code and yielded pseudoranging pulses.

If, at step 509, all Döppler-errors have not been processed, then control loops back to step 516, where the next Döppler-error time and frequency-offset factors are selected and processing continues at step 501 to explore further Satellite IDs, as implied by the next Döppler-error frequency, else the pseudoranging and satellite ID process is complete at 510.

It should be understood that the programs, processes, methods and systems described herein are not related or limited to any particular type of computer or network system (hardware or software), unless otherwise indicated. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

What is claimed is:

1. A method for extracting Döppler-error components from digitized signal samples transmitted by a satellite, said method comprising the steps of:

receiving and digitizing said signals to produce digitized samples;

squaring said digitized signal samples to produce squared samples;

decimating said squared samples;

auto-correlating said squared samples to produce an auto-correlate; and transforming said auto-correlate to the frequency domain.

2. The method of claim 1 comprising the further steps of:

obtaining the significant frequency components of said auto-correlate; and scaling said frequency components for actual offset frequencies.

3. The method of claim 1 wherein said step of decimating the squared samples includes:

applying said squared samples to a low-pass filter, creating narrow-band samples, said narrow-band samples having a plurality of sinusoidal components, wherein said low-pass filter reduces the signal and noise bandwidth of said squared samples and reduces the number of narrow-band samples to be Fourier transformed.

4. A computer useable medium having stored therein instructions for causing a processing unit to execute the following method:

receiving and digitizing said satellite signals to produce digitized signal samples;

squaring said digitized signal samples to produce squared samples;

decimating said squared samples;

auto-correlating said squared samples to produce an auto-correlate; and transforming said auto-correlate to the frequency domain.

5. A machine having a memory which contains data representing auto-correlates, said auto-correlates generated by the following method:
    receiving and digitizing said satellite signals to produce digitized signal samples;
    squaring said digitized signal samples to produce squared samples;
    decimating said squared samples;
    auto-correlating said squared samples to produce an auto-correlate; and
    transforming said auto-correlate to the frequency domain.

6. A method of noise-filtering the digitized signal samples of said signals received from said satellites, said signals from satellites containing noise-energy, said method comprising the steps of:
    receiving and digitizing said noisy signals to produce digitized signal samples, said digitized signal samples having been squared;
    auto-correlating said squared samples to emphasize the sinusoidal components in said squared samples, wherein said auto-correlation produces an auto-correlate that concentrates said noise-energy of said squared samples in a zero-time-shift component; and
    removing said zero-time-shift component from the auto-correlate.

7. The method of claim 6 comprising the further steps of:
    transforming said auto-correlate to the frequency domain; and
    examining the resulting spectrum of said auto-correlate to obtain the frequency-offset components of said auto-correlate; and
    scaling said frequency-offset components to yield actual offset frequencies.

8. The method of claim 7 comprising the further steps of:
    using an actual offset frequency to compensate said digitized signal samples for a frequency-offset; and
    determining the satellite identification code from said compensated digitized signal samples.

9. The method of claim 7 comprising the further steps of:
    using the actual offset frequencies to compensate the digitize signal samples for the frequency-offsets; and
    determining the pseudorange timing to said satellite from said compensated digitized signal samples.

10. A computer useable medium having stored therein instructions for causing a processing unit to execute the following method:
    receiving and digitizing signals from satellites, said digitized signals having been squared, said signals from satellites containing noise-energy;
    auto-correlating said squared samples of digitized signals received from said satellite signals to emphasize the sinusoidal components in said squared samples, wherein said auto-correlation produces an auto-correlate that concentrates said noise-energy of said squared samples in a zero-time-shift component; and
    removing said component from the auto-correlate.

11. A machine having a memory which contains data representing digitized samples of satellite signals, said samples of satellite signals produced by the following method:
    receiving and digitizing signals from satellites, said digitized signals having been squared, said signals from satellites containing noise;
    auto-correlating said squared samples of digitized signals received from said satellite signals to emphasize the sinusoidal components in said squared samples, wherein said auto-correlation produces an auto-correlate that concentrates said noise-energy of said squared samples in a zero-time-shift component; and
    removing said component from the auto-correlate.

12. A method for extracting frequency-offset components for compensating for the frequency-offsets contained in the digitized signal samples of signals transmitted by a satellite, said method comprising the steps of:
    receiving and digitizing said digitized signal signals to produce digitized signal samples;
    squaring said digitized signal samples to produce squared samples;
    decimating said squared samples;
    auto-correlating said squared samples to produce an auto-correlate;
    transforming said auto-correlate to the frequency domain;
    examining the resulting spectrum of said auto-correlate to obtain the frequency-offset components of said auto-correlate;
    scaling said frequency-offset components to yield actual offset frequencies; and
    using said actual offset frequencies to compensate for said frequency-offsets of said digitized signal samples.

13. The method of claim 12 further comprising the additional step of using one of said actual offset frequencies to obtain a unique identifier for said satellite transmitting said signal.

14. The method of claim 12 including the further steps of computing satellite ID and pseudorange information and transmitting said Satellite ID and pseudorange information to an operations center.

15. A computer useable medium having stored therein instructions for causing a processing unit to execute the following method:
    receiving and digitizing signals from satellites to produce digitized samples;
    squaring said digitized signal samples to produce squared samples;
    auto-correlating said squared samples to produce an auto-correlate;
    transforming said auto-correlate to the frequency domain;
    examining the resulting spectrum of said squared samples to obtain the frequency-offset components of said auto-correlate;
    scaling said frequency-offset components to yield actual offset frequencies; and
    using said actual offset frequencies to compensate for said frequency-offsets components of said digitized signal samples.

16. A device for extracting carrier components from digitized signal samples of signals transmitted by a satellite, comprising:
    means for receiving and digitizing said signals to produce digitized samples;
    means for squaring said digitized samples to produce squared samples; and
    means for auto-correlating said squared samples to produce an auto-correlate.

17. The device of claim 16 further comprising:
    means for obtaining frequency-offset components of said auto-correlate; and means for scaling said frequency-offset components to yield the actual offset frequencies.

18. The device of claim 16 further including means for decimating the squared samples includes means for low-pass filtering said squared samples to create narrow-band samples, said narrow-band samples having a plurality of sinusoidal components, wherein said low-pass filter reduces the signal and noise bandwidth of said squared samples.

19. The device of claims 16, 17 or 18 wherein said device is an integral portion of a two-way wireless device.

20. The device of claims 16, 17 or 18 wherein said device is included in an attachment, said attachment being coupled to a two-way wireless device.

21. A device for filtering digitized samples of signals received from a satellite, said device comprising:
    means for receiving a digitized signal from said satellite, said signal containing noise-energy;
    means for digitizing the signal, to provide digitized samples;
    means for squaring said digitized signal samples, to provide a squared sample of signals from said satellite;
    means for auto-correlating said squared samples of signals received from said satellite, to produce a signal sample that emphasizes the sinusoidal components in said squared sample, whereby said auto-correlation produces an auto-correlate that concentrates said noise-energy of said squared samples in a zero-time-shift component; and
    means for removing said zero-time-shift component from the auto-correlate.

22. The device of claim 21 further comprising:
    means for transforming said auto-correlate to the frequency domain;
    means for examining the resulting spectrum of said auto-correlate to obtain the frequency-offset components of said auto-correlate; and
    means for scaling said frequency-offset components to yield actual offset frequencies.

23. The device of claim 21 further comprising:
    means for compensating for the Döppler-errors to enable determining the unique satellite identification code.

24. The device of claims 21, 22 or 23 wherein said device is an integral portion of a two-way wireless device.

25. The device of claims 21, 22 or 23 wherein said device is included in an attachment, said attachment being coupled to a two-way wireless device.

26. A wireless device comprising:
    an antenna that receives and transmits full-duplex wireless signals to and from a user;
    processing means, coupled to said antenna, for processing said wireless signals to produce audio signals and communicating said audio signals to said user;
    a GPS antenna to receive GPS signals, said GPS signal containing noise-energy;
    means for digitizing said GPS signals into digitized signal samples;
    means for squaring said digitized signal samples to produce squared samples;
    means for decimating said squared samples;
    auto-correlation means for auto-correlating said squared samples to produce an auto-correlate; and
    means for transforming said auto-correlate to the frequency domain.

27. The wireless device of claim 26 wherein said auto-correlation means comprises:
    means for emphasizing the sinusoidal components of said squared signal samples;
    means for concentrating said noise-energy of said squared sample in a zero-time-shift component; and
    means for removing said zero-time-shift component from said auto-correlate.

28. A wireless device attachment comprising:
    means for receiving GPS signals, said GPS signals containing noise-energy;
    means for digitizing said GPS signals into digitized signal samples;
    means for squaring said digitized signal samples to produce squared samples;
    means for decimating said squared samples;
    means for auto-correlating squared sample to produce an auto-correlate; and
    means for transforming said auto-correlate to the frequency domain.

29. The wireless device attachment of claim 28 further comprising:
    means for emphasizing the sinusoidal components in said squared samples,
    means for concentrating said noise-energy in said squared samples in a zero-time-shift component; and
    means for removing said zero-time-shift component from said auto-correlate.

30. A method for extracting Döppler-errors from a set of digitized samples of signals transmitted by a satellite, said method comprising the steps of:
    receiving and capturing a set of digitized signal samples of said signals;
    squaring said digitized signal samples to produce a set of squared samples;
    auto-correlating said set of squared samples to produce an auto-correlate; and
    transforming said auto-correlate to the frequency domain.

31. The method of claim 30 comprising the further steps of:
    obtaining frequency-offset components of said auto-correlate; and
    scaling said frequency-offset components to yield actual offset frequencies.

32. A computer useable medium having stored therein instructions for causing a processing unit to execute the following method:
    receiving and capturing a set of digitized samples of signals from satellites;
    squaring said digitized signal samples to produce a set of squared samples;
    auto-correlating said set of squared samples to produce an auto-correlate; and
    transforming said auto-correlate to the frequency domain.

33. A method for extracting carrier components from a set of digitized samples of signals transmitted by a satellite, said method comprising the steps of:
    receiving and capturing a set of digitized samples of said signals from satellites;
    squaring said digitized samples to produce a set of squared samples;

auto-correlating said set of squared samples to produce an auto-correlate; and transforming said auto-correlate to the frequency domain.

34. The method of claim 33 comprising the further steps of:

obtaining the frequency-offset components of said squared auto-correlate; and scaling said frequency-offset components to yield actual offset frequencies.

35. The method of claim 33 wherein said step of decimating the squared samples includes:

applying said squared samples to a low-pass filter and creating a plurality of narrow-band samples, said narrow-band signals having a plurality of sinusoidal components, wherein said low-pass filter reduces the signal and noise bandwidth of said samples.

36. A computer useable medium having stored therein instructions for causing a processing unit to execute the following method:

receiving and capturing a set of digitized signal samples of signals from satellites;

squaring said digitized samples to produce a set of squared samples;

decimating said squared samples; and transforming said squared samples to the frequency domain.

37. A method for extracting frequency-offset components to compensate for the time-shifts caused by the frequency-offsets contained in the digitized samples of signals transmitted by a satellite, said method comprising the steps of:

receiving and digitizing said signals to produce digitized signal samples;

squaring said digitized signal samples to produce squared samples;

decimating said squared samples;

auto-correlating said squared samples to produce an auto-correlate;

transforming said auto-correlate to the frequency domain;

examining the resulting spectrum of said auto-correlate to obtain the frequency-offset components of said auto-correlate;

scaling said frequency-offset components to yield actual offset frequencies; and using said actual offset frequencies to compensate for the Doppler-time-shift related to the said frequency-offsets components of said auto-correlate.

38. The method of claim 37 further comprising the additional step of using said actual offset frequencies to obtain a unique identifier for said satellite transmitting said signal.

39. The method of claim 37 including the further steps of computing satellite ID and pseudorange information and transmitting said satellite ID and pseudorange information to an operations center.

* * * * *